United States Patent
Shiau (10) Patent No.: US 8,223,309 B2
(45) Date of Patent: Jul. 17, 2012

(54) DISPLAY PANEL HAVING DIFFERENT THICKNESS OF ALIGNMENT LAYERS IN DIFFERENT REGIONS

(75) Inventor: Yi-Hau Shiau, Taichung County (TW)

(73) Assignee: Au Optronics Corporation, Hsinchu (TW)

( * ) Notice: Subject to any disclaimer, the term of this patent is extended or adjusted under 35 U.S.C. 154(b) by 219 days.

(21) Appl. No.: 12/624,422

(22) Filed: Nov. 24, 2009

(65) Prior Publication Data

US 2011/0085118 A1 Apr. 14, 2011

(30) Foreign Application Priority Data

Oct. 13, 2009 (TW) ................................. 98134640 A (51) Int. Cl.
 *G02F 1/1339* (2006.01)
 *G02F 1/1345* (2006.01)
 *G02F 1/1337* (2006.01)
(52) U.S. Cl. ......... 349/153; 349/128; 349/152; 349/190
(58) Field of Classification Search .................. 349/128, 349/152–154, 190
See application file for complete search history.

(56) References Cited

U.S. PATENT DOCUMENTS 6,099,786 A 8/2000 Hu et al.

2006/0197902 A1* 9/2006 Cho et al. ................. 349/153
2007/0296899 A1* 12/2007 Murade .................... 349/139

FOREIGN PATENT DOCUMENTS

| JP | 08-262444 | 10/1996 |
| JP | H10-282515 | 10/1998 |
| JP | H11-142851 | 5/1999 |
| JP | 2006-301115 | 11/2006 |

OTHER PUBLICATIONS

"First Office Action of China Counterpart Application", issued on Apr. 21, 2011, p. 1-p. 4.

* cited by examiner

*Primary Examiner* — Jessica M Merlin
(74) *Attorney, Agent, or Firm* — Jianq Chyun IP Office (57) ABSTRACT

A display panel provided with a first region and a second region includes an active device array substrate, an opposite substrate, a display medium between the active device array substrate and the opposite substrate and a conductive member. The active device array substrate includes an active device array, a pad located in the second region and a first alignment layer covering the first region and the second region. The opposite substrate includes an electrode layer and a second alignment layer covering the electrode layer. The ratio of a thickness of the first or second alignment layer in the second region to that in the first region is substantially greater than zero and less than or equal to about 0.43. The conductive member is located in the second region and corresponding to the pad and penetrates the first alignment layer and the second alignment layer to connect the electrode layer and the pad.

15 Claims, 5 Drawing Sheets

DISPLAY PANEL HAVING DIFFERENT THICKNESS OF ALIGNMENT LAYERS IN DIFFERENT REGIONS

CROSS-REFERENCE TO RELATED APPLICATION

This application claims the priority benefit of Taiwan application serial no. 98134640, filed Oct. 13, 2009. The entirety of the above-mentioned patent application is hereby incorporated by reference herein and made a part of specification.

BACKGROUND OF THE DISCLOSURE

1. Technical Field

The present disclosure relates to a display panel and a manufacturing method thereof, and particularly to the display panel and the manufacturing method provided with a design of its alignment layer and relevant elements to eliminate light leakage.

2. Description of Related Art

The relative position of the alignment layer and the sealant between an upper substrate and a lower substrate is considerable in fabricating the present liquid crystal display panel, so as to comply with the design of slim bezel (or named slim frame) or obtain large usable area on the panel. Furthermore, prevention of the light leakage and the signal transmission between the upper substrate and the lower substrate are still important issues in the design of slim bezel.

A conventional liquid crystal display panel has alignment layers entirely formed on the upper substrate and the lower substrate respectively in a uniform thickness. However, when a misalignment occurs in the assembly of the upper substrate and the lower substrate, an alignment layer at unexpected location may obstruct the electrical connection built between an electrode layer of the upper substrate and a pad of the lower substrate by a conductive member in the sealant. In addition, the alignment layer at unexpected location may further affect the alignment of liquid crystal molecules and thus result in light leakage.

An alignment layer formed with an opening corresponding to the position of the conductive member is further proposed in the prior art to conduct the upper substrate and the lower substrate via the conductive member. Nonetheless, light leakage still occurs at the opening, and thereby affects the display quality.

SUMMARY OF THE DISCLOSURE

The present disclosure is directed to a display panel, which complies with the requirement of slim bezel (or named slim frame) and prevent the obstruction of the alignment layer between the electrode layer and the pad, so as to conduct the alignment layer between the electrode layer and the pad, and provide an effective alignment near the conductive member to prevent light leakage due to abnormal alignment of the display medium, e.g. liquid crystal molecules.

The present disclosure is also directed to an active device array substrate applied to the aforementioned display panel.

The present disclosure is further directed to a method of manufacturing the aforementioned display panel.

As embodied and broadly described herein, the present disclosure provides a display panel having a first region and a second region. The display panel comprises an active device array substrate, an opposite substrate, a display medium and a conductive member. The active device array substrate comprises an active device array, a pad located in the second region, and a first alignment layer covering the first region and the second region. The thickness of the first alignment layer in the first region is substantially greater than a thickness of the first alignment layer in the second region, and the ratio of the thickness of the first alignment layer in the second region to the thickness of the first alignment layer in the first region is substantially greater than zero and less than or equal to about 0.43. In addition, the opposite substrate is disposed opposite to the active device array substrate. The opposite substrate includes an electrode layer and a second alignment layer covering the electrode layer. The thickness of the second alignment layer in the first region is substantially greater than a thickness of the second alignment layer in the second region, and the ratio of the thickness of the second alignment layer in the second region to the thickness of the second alignment layer in the first region is substantially greater than zero and less than or equal to about 0.43. The display medium is disposed between the active device array substrate and the opposite substrate. The conductive member is disposed between the active device array substrate and the opposing substrate, and the conductive member is located in the second region and corresponding to the pad. The conductive member penetrates the first alignment layer and the second alignment layer to connect the electrode layer and the pad.

In an embodiment, the first region comprises a display region, the second region is located in a peripheral circuit region outside the display region, and the active device array is located in the display region.

In an embodiment, the display panel further comprises a sealant disposed in the peripheral circuit region, wherein the conductive member is located within the sealant.

In an embodiment, the display medium may be a liquid crystal layer.

The present disclosure further provides an active device array substrate having a first region and a second region. The active device array substrate comprises an active device array, a pad located in the second region and a first alignment layer covering the first region and the second region. The thickness of the first alignment layer in the first region is substantially greater than a thickness of the first alignment layer in the second region, and the ratio of the thickness of the first alignment layer in the second region to the thickness of the first alignment layer in the first region is substantially greater than zero and less than or equal to about 0.43.

In an embodiment, the first region comprises a display region, the second region is located in a peripheral circuit region outside the display region, and the active device array is located in the display region.

The present disclosure further provides a method of manufacturing a display panel. Firstly, an active device array substrate having a first region and a second region is provided. The active device array substrate includes an active device array, a pad located in the second region and a first alignment layer covering the first region and the second region. The thickness of the first alignment layer in the first region is substantially greater than a thickness of the first alignment layer in the second region, and the ratio of the thickness of the first alignment layer in the second region to the thickness of the first alignment layer in the first region is substantially greater than zero and less than or equal to about 0.43. Then, an opposite substrate disposed opposite to the active device array substrate is provided. The opposite substrate includes an electrode layer and a second alignment layer covering the electrode layer. The thickness of the second alignment layer in the first region is substantially greater than a thickness of the second alignment layer in the second region, and the ratio of the thickness of the second alignment layer in the second region to the thickness of the second alignment layer in the first region is substantially greater than zero and less than or equal to about 0.43. Next, a display medium and a conductive member are provided between the active device array substrate and the opposite substrate, wherein the conductive member is located in the second region and corresponding to the pad. After assembling the active device array substrate and the opposite substrate, the conductive member penetrates the first alignment layer and the second alignment layer to connect the electrode layer and the pad.

In an embodiment, the method of forming the first alignment layer or the second alignment layer comprises performing a transfer printing process by a photosensitive resin printing plate (or named printing plate) to print alignment material on the active device array substrate or the opposite substrate.

In an embodiment, the printing plate has a plurality of transferring bumps thereon, and the distribution density of the transferring bumps corresponding to the second region is substantially less than the distribution density of the transferring bumps corresponding to the first region.

In an embodiment, the printing plate has a plurality of transferring bumps thereon, and the height of the transferring bumps corresponding to the second region is different from the height of the transferring bumps corresponding to the first region.

In an embodiment, the method of forming the first alignment layer and the second alignment layer comprises inkjet printing.

In an embodiment, the first region comprises a display region, the second region is located in a peripheral circuit region outside the display region, and the active device array is located in the display region.

In an embodiment, the manufacturing method further comprises forming a sealant in the peripheral circuit region to surround the display region before assembling the active device array substrate and the opposite substrate, wherein the conductive member is disposed within the sealant.

Since the thickness of the alignment layer corresponding to the conductive member and the pad is substantially less than the alignment layer in other region, the conductive member can penetrate the alignment layer rather than be obstructed by the alignment layer, so as to conduct the electrode layer and the pad. Furthermore, the alignment layer is preserved to completely cover the region except the bonding area of the conductive member, so as to provide an effective alignment near the conductive member in preventing light leakage due to abnormal alignment of the display medium, e.g. liquid crystal molecules.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure and are incorporated in and constitute a part of this specification. The drawings illustrate embodiments of the disclosure and, together with the description, serve to explain the principles of the disclosure.

DESCRIPTION OF EMBODIMENTS

The present disclosure modulates thicknesses of the alignment layer in different regions of the display panel, wherein the thickness of the alignment layer corresponding to the pad and the conductive member is substantially less than that in the other region, such that after the active device array substrate and the opposite substrate are assembled with each other, the conductive member can penetrate the alignment layers on the active device array substrate and the opposite substrate respectively to conduct the electrode layer and the pad for providing a signal transmission path therebetween.

The structure and the method of manufacturing the display panel of the present disclosure will be illustrated in the following embodiments.

Figure 1:
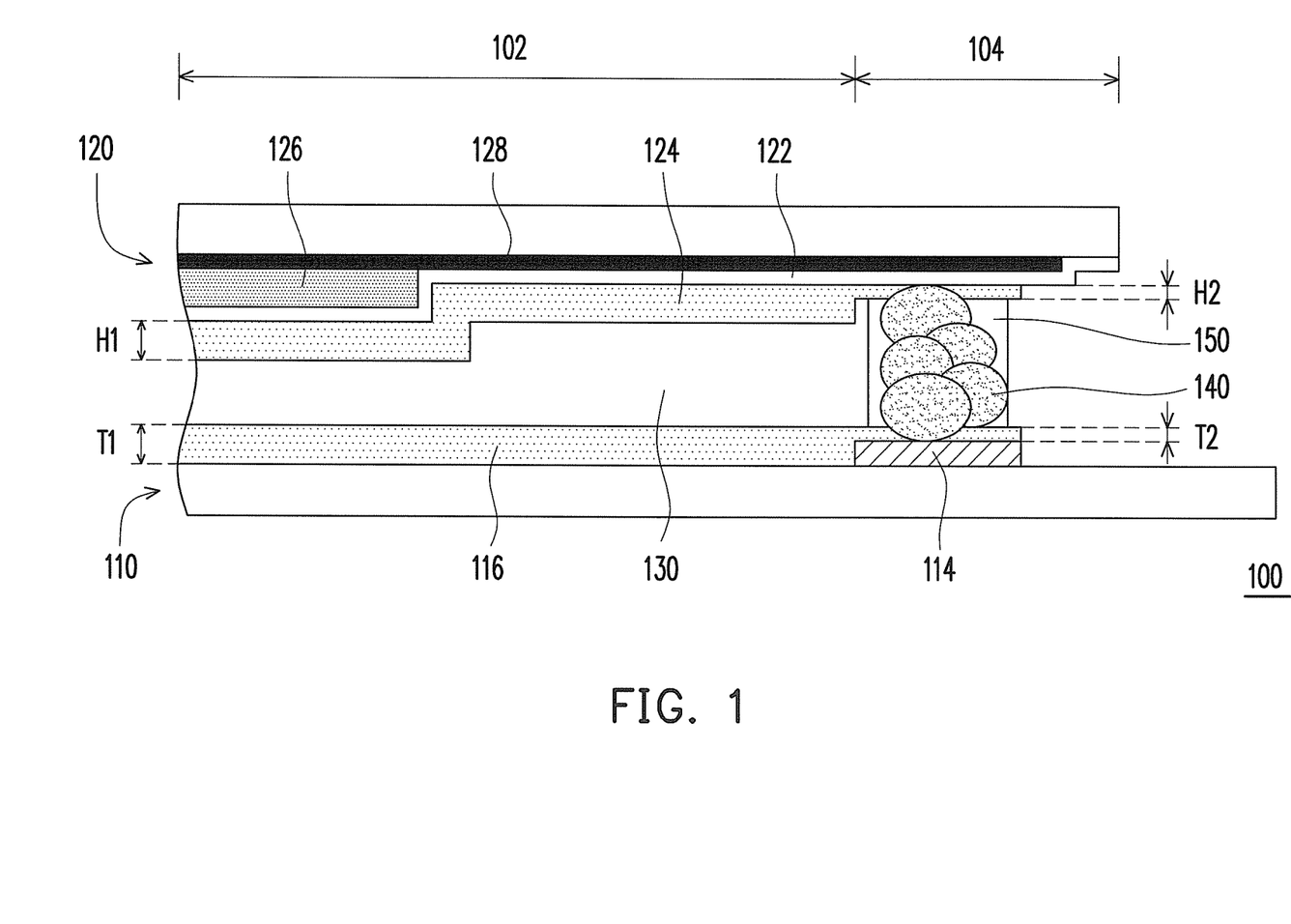
FIG. 1 illustrates a partial sectional view of a display panel according to an embodiment of the present disclosure.
Figure 2:
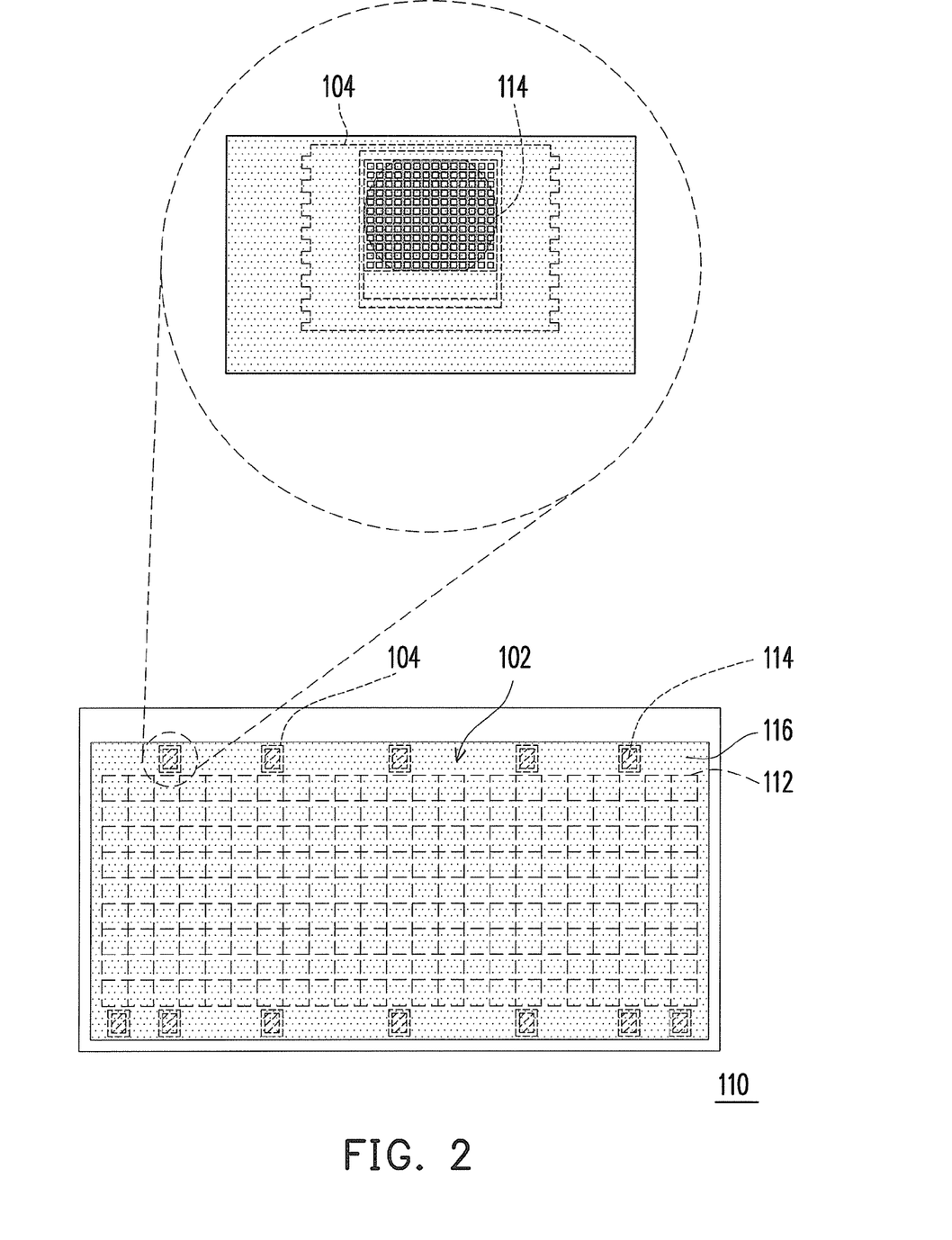
FIG. 2 is a top view of an active device array substrate of the display panel in FIG. 1.

FIG. 1 is a partial sectional view of a display panel according to an embodiment of the present disclosure. FIG. 2 is a top view of an active device array substrate of the display panel in FIG. 1. Referring to FIGS. 1 and 2, the display panel 100 comprises an active device array substrate 110, an opposite substrate 120, a display medium 130, and a conductive member 140. The active device array substrate 110 comprises an active device array 112, at least a pad 114 (FIG. 1 show plural pads 114) and a first alignment layer 116. The display panel 100 has a first region 102 and a second region 104. In this embodiment, the region corresponding to the pads 114 is defined as the second region 104, and the other region belongs to the first region 102. In addition, the first alignment layer 116 covers the first region 102 and the second region 104.

As shown in FIG. 2, the pads 114 may be transfer pads located in the peripheral circuit region of the active device array substrate 110. The pads 114 are arranged around the display region in the active device array substrate 110 for transmitting signals between the active device array substrate 110 and the opposite substrate 120. The active device array 112 is located in the display region of the active device array substrate 110. In other words, the first region 102 defined in this embodiment includes the display region, while the second region 104 is located in the peripheral circuit region.

However, definition of the first region 102 and the second region 104 in this embodiment is exemplary, and may vary with design requirements. For example, the definition of the first region 102 and the second region 104 depends on the position of the pads 114. That is, according to the variation of function and position of the pads 114, both of the first region 102 and the second region 104 may be arranged in the display region or other positions.

Referring to FIGS. 1 and 2, the opposite substrate 120 is disposed opposite to the active device array substrate 110, and the opposite substrate 120 comprises an electrode layer 122 and a second alignment layer 124. The electrode layer 122 may function as a common electrode, while the second alignment layer 124 covers the electrode layer 122. The display medium 130 is disposed between the active device array substrate 110 and the opposite substrate 120. In addition, the conductive member 140 is disposed between the active device array substrate 110 and the opposing substrate 120, wherein the conductive member 140 is located in the second region 104 and corresponding to the pads 114.

The illustrated embodiment provides no limitation to the types of the display panel 100, wherein performance of the display panel 100 varies with the type of the display medium 130. For example, the display medium 130 can be a liquid crystal material or other materials operated on the same principle. If the liquid crystals are used as the display medium 130, the display panel 100 is a liquid crystal display panel. In the following embodiments, the liquid crystal display panel is illustrated as an example, while those skilled in the art may further apply the concept of the illustrated embodiments to other types of display panel.

In the present embodiment, the active device array substrate 110 may be a TFT array substrate, while the opposite substrate 120 may be a color filter substrate comprising a color filter layer 126 and a black matrix 128. In other embodiments, the active device array substrate 110 may be a COA (color filter on array) substrate integrated the color filter layer 126 onto the active device array 112, a BOA (black matrix on array) substrate integrated with further the black matrix 128 onto the active device array 112, or an AOC (array on color filter) substrate integrated the active device array 112 onto the color filter layer 126. Herein, the opposite substrate 120 is provided without a color filter layer.

Referring to FIGS. 1 and 2, the present disclosure modulates thicknesses of the first alignment layer 116 of the active device array substrate 110 and the second alignment layer 124 of the opposite substrate 120 in different regions of the display panel 100, wherein the thicknesses of the first alignment layer 116 and the second alignment layer 124 both corresponding to the pad 114 and the conductive member 140 are substantially less than those in the other region, such that after the active device array substrate 110 and the opposite substrate 120 are assembled with each other, the conductive member 140 can penetrate the first alignment layer 116 and the second alignment layer 124 to conduct the electrode layer 122 and the pads 114.

Particularly, the illustrated embodiment reduce the thicknesses of the first alignment layer 116 and the second alignment layer 124 corresponding to the pads 114 and the material 140 rather than remove them all, such that the conductive member 140 can penetrate the first alignment layer 116 and the second alignment layer 124 after assembling the active device array substrate 110 with the opposite substrate 120, so as to conduct the electrode layer 122 and the pads 114. Preferably, the ratio of a thickness H2 of the first alignment layer 116 in the second region 104 (i.e. corresponding to the pads 114) to a thickness H1 of the first alignment layer 116 in the first region 102 is substantially greater than zero and less or equal to about 0.43. As embodied in a conventional alignment layer, the first alignment layer 116 in the first region 102 has the thickness H1 about 700 angstrom or more, while the thickness H2 of the first alignment layer 116 in the second region 104 can be obtained by multiplying the thickness H1 by the ratio such as about 0.43 and regarded as being substantially equal to or less than about 300 angstrom. Similarly, the ratio of a thickness T2 of the second alignment layer 124 in the second region 104 to a thickness T1 of the second alignment layer 124 in the first region 102 is substantially greater than zero and less or equal to about 0.43. As embodied in a conventional alignment layer, the second alignment layer 124 in the first region 102 has the thickness T1 about 700 angstrom or more, while the thickness T2 of the second alignment layer 116 in the second region 104 can be obtained by multiplying the thickness T1 by the ratio such as about 0.43 and regarded as being substantially equal to or less than about 300 angstrom.

In addition, the display panel 100 of the embodiment further comprises a sealant 150 disposed in the peripheral circuit region of the display panel 100 for surrounding the display region and sealing the display medium 130 between the active device array substrate 110 and the opposite substrate 120. In this embodiment, the conductive member 140 is disposed in the sealant 150. Alternatively, the conductive member 140 may disposed outside the sealant 150 in other embodiments of the present disclosure. The conductive member 140 herein may be embodied as any type of applicable material, such as silver paste, Au balls, or transfer members. In other words, the conductive member 140 can be made of conductive member or formed by an insulation material with a conductive coating thereon. Hence, this embodiment does not restrict the composition of the conductive member.

Moreover, the present disclosure provides no limitation on the position of the conductive member. Except being disposed within the sealant 150 as the conductive member 140 illustrated in the above embodiment, the conductive member of other embodiments can further be disposed on any proper position. In accordance with the definition of the first region 102 and the second region 104, the position of the conductive member 140 depends on the arrangement of the pads 114. That is, complying with the position of the pads, the conductive member 140 may be located in the display region rather than within the sealant 150.

Accordingly, in the above illustrated manufacturing method of the display panel, the conductive member 140 can penetrate the first alignment layer 116 of the active device array substrate 110 and the second alignment layer 124 of the opposite substrate 120 after assembling the active device array substrate 110 and the opposite substrate 120 and forming the display medium 130 therebetween, so as to connect the electrode layer 122 and the pads 114 and provide a signal transmission path between the active device array substrate 110 and the opposite substrate 120. Furthermore, an optional sealant 150 can be formed in the peripheral circuit region of the display panel 100 to surround the display region before assembling the active device array substrate 110 and the opposite substrate 120, wherein the conductive material 140 may be disposed within the sealant 150.

In this illustrated embodiment, the method of forming the first alignment layer 116 or the second alignment layer 124 comprises performing a resin printing plate to print alignment material on the active device array substrate 110 or the opposite substrate 120, so as to provide the first alignment layer 116 with different thicknesses or the second alignment layer 124 with different thicknesses. The resin printing plate can be Asahi photosensitive resin printing plate (APR printing plate) or other suitable printing plate. Particularly, a surface of the printing plate can be configured be achieve the effect of forming the first alignment layer 116 or the second alignment layer 124 with different thicknesses in a single printing step.

Figure 3:
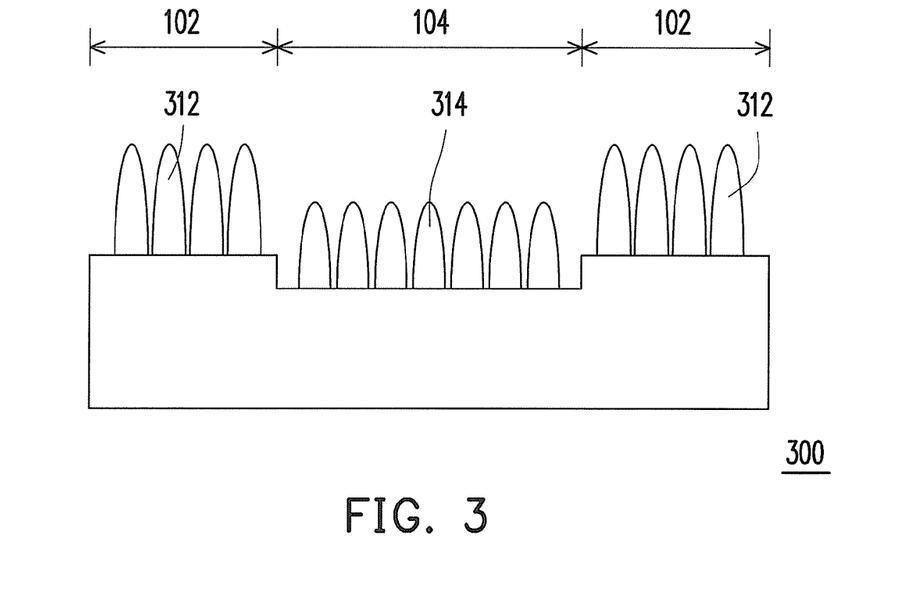
FIG. 3 illustrates a partial sectional view of a printing plate for fanning an alignment according to an embodiment of the present disclosure.

FIG. 3 is a partial sectional view of a printing plate for forming the first alignment layer 116 or the second alignment layer 124 according to an embodiment of the present disclosure. Referring to FIG. 3, the printing plate 300 has a plurality of transferring bumps 312 and 314 thereon, wherein the height of the transferring bumps 314 corresponding to the second region 104 is less than the height of the transferring bumps 312 corresponding to the first region 102. In other embodiment of the present disclosure, the height of the transferring bumps 314 corresponding to the second region 104 is greater than the height of the transferring bumps 312 corresponding to the first region 102. In other words, the height of the transferring bumps 314 corresponding to the second region 104 is different from the height of the transferring bumps 312 corresponding to the first region 102.

Figure 4:
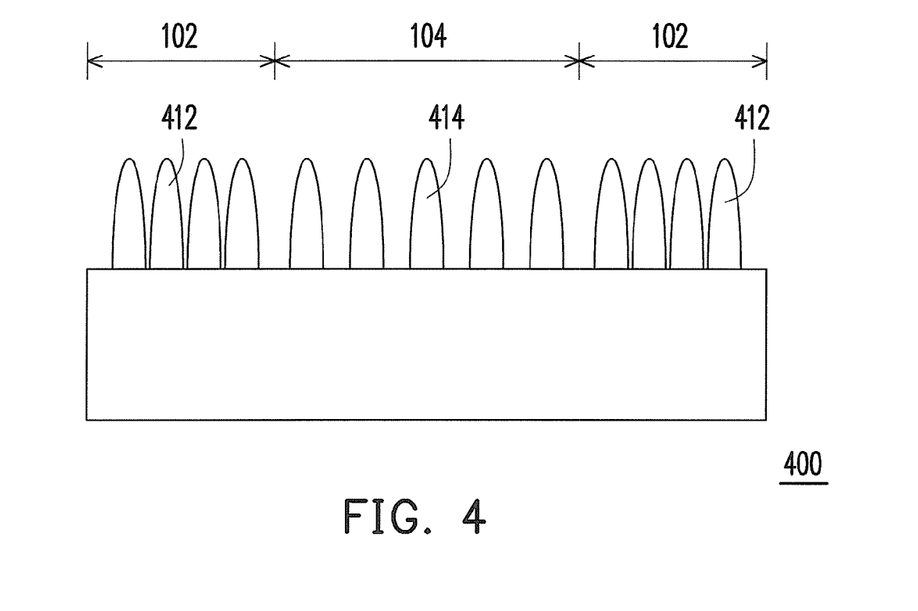
FIG. 4 illustrates a partial sectional view of a printing plate for forming an alignment according to another embodiment of the present disclosure.
Figure 5A:
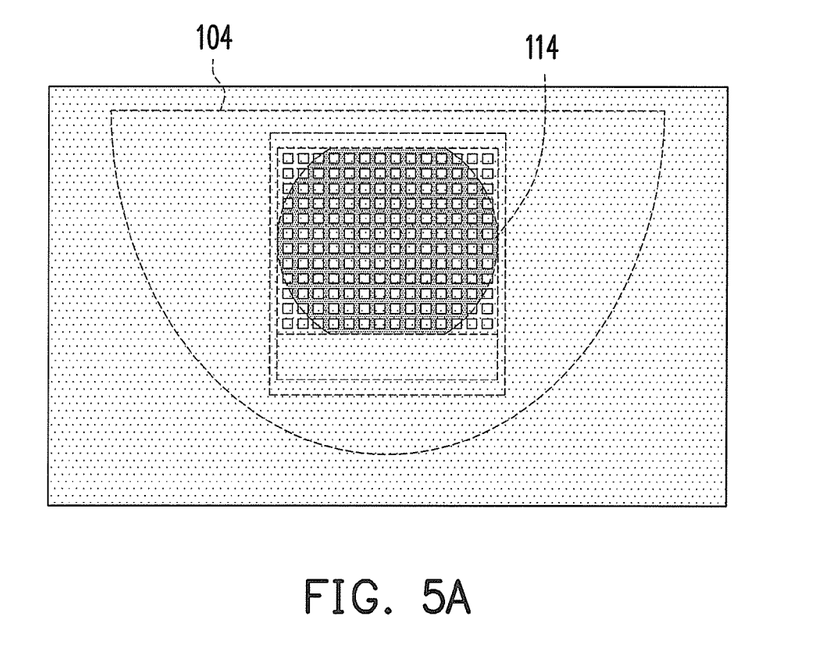
FIGS. 5A through 5D are partial enlarged views of the pad and the surrounding structure.
Figure 5B:
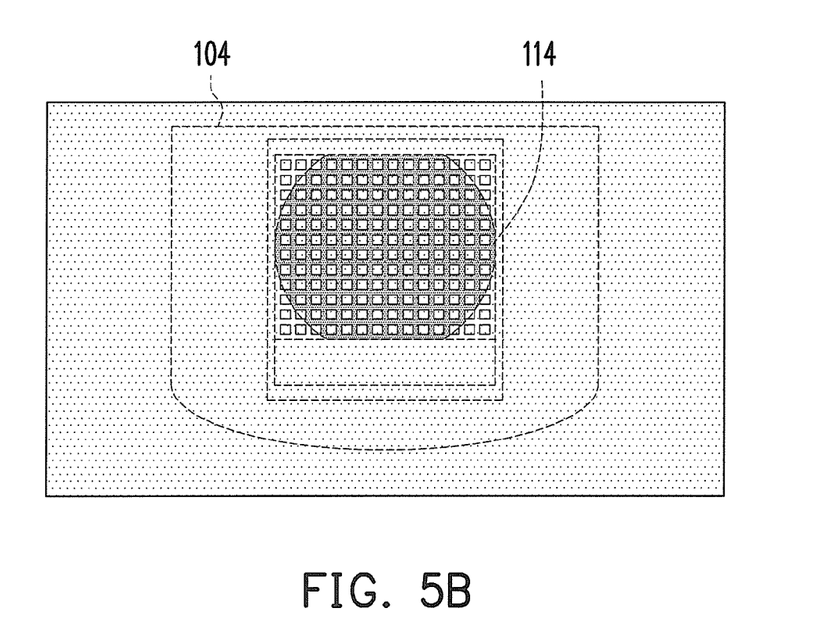
Figure 5C:
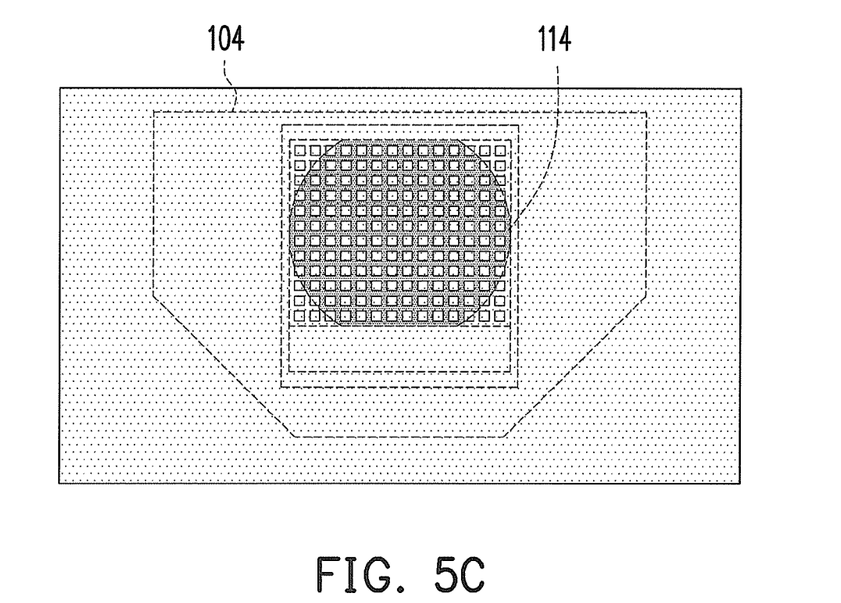
Figure 5D:
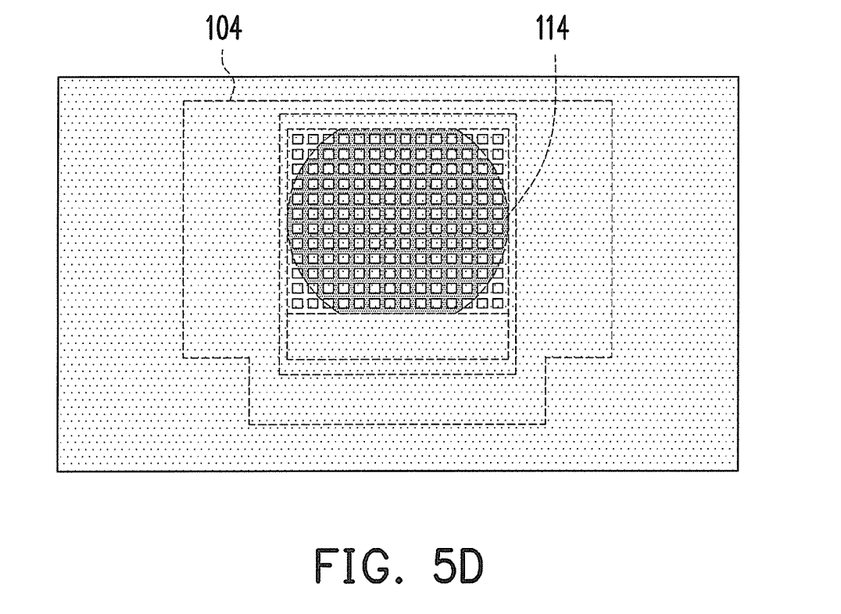

FIG. 4 is a partial sectional view of a printing plate for forming the first alignment layer 116 or the second alignment layer 124 according to another embodiment of the present disclosure. Referring to FIG. 4, the printing plate 400 has a plurality of transferring bumps 412 and 414 thereon, wherein the distribution density of the transferring bumps 414 corresponding to the second region 104 is substantially less than the distribution density of the transferring bumps 412 corresponding to the first region 102. Wherein the height of the transferring bumps 414 corresponding to the second region 104 is substantially equal to the height of the transferring bumps 412 corresponding to the first region 102. In this embodiment, the distribution density of the transferring bumps 412 corresponding to the first region 102 may be 200 per unit area, while the distribution density of the transferring bumps 414 corresponding to the second region 104 may be 100 per unit area. However, the distribution density of the transferring bumps 412 or 414 is not limited thereto. In other embodiment, the relationship of height between the transferring bumps 412 and 414 of the printing plate in FIG. 4 can further be regulated in reference to that between the transferring bumps 212 and 214 of the printing plate in FIG. 3. In other words, the height of the transferring bumps 414 corresponding to the second region 104 may be different from the height of the transferring bumps 412 corresponding to the first region 102.

The height or the distribution density of the surface structure (i.e. the transferring bumps) is regulated to control the amount of the alignment material coated on the printing plate in printing, so as to reduce the alignment material transferred to the second region 104 and thus forming the alignment layer in a thinner thickness.

Likewise, except the method of forming the first alignment layer 116 with different thicknesses or the second alignment layer 124 with different thicknesses in the above embodiment, the first alignment layer 116 or the second alignment layer 124 can further be formed by other proper methods, such as inkjet printing, photolithography, dry film attaching, or the combinations thereof.

In addition, preferably, the second region defined in the above embodiments requires merely covering the bonding region of the pads 114 and the conductive members 140. However, regarding the precision and the probable misalignment of the printing process or other process, the size of the second region 104 may usually be substantially greater than or substantially equal to the size of the pads 114, to ensure that the conductive member 140 can successfully penetrate the first alignment layer 116 and the second alignment layer 124 in the second region 104, to conduct the electrode layer 122 and the pad 114. As shown in the partial enlarged view of FIG. 2, the size of the second region 104 is substantially greater than the size of the pad 114 so as to completely cover the pad 114. Otherwise, the shape of the second region 104 may vary with the shape of the pad 114. FIGS. 5A through 5D are partial enlarged views showing a variety of second regions 104 in different shapes and the corresponding pads 114. As embodied in forming the alignment layer by the printing plate, the surface structures on the printing plate can be regulated to form the second regions 104 in different shapes. Otherwise, as forming the second regions 104 in different shapes by performing photolithography process, masks in different patterns is required.

Furthermore, Referring to FIGS. 1 and 5A through 5D, the pad 114 can be formed in a mash pattern, so as to increase conductive area and improve the bondibility between the conductive member 140 and the pad 114.

However, shape, function, position, and size of the pad are not limited in the present disclosure. Any pad configured in conducting with an opposite substrate of a display panel via a conductive member can be applied herein without departing the scope of the present disclosure. By which, an alignment layer in thinner thickness is provided corresponding to the pad, such that the conductive member can penetrate the thinner alignment layer and conduct the pad to the circuit of the opposite substrate.

In summary, the present disclosure modulates thicknesses of the alignment layer in different regions of the display panel, wherein the thickness of the alignment layer corresponding to the pad and the conductive material is substantially less than that in the other region, such that after the active device array substrate and the opposite substrate are bonded with each other, the conductive material can penetrate the alignment layers on the active device array substrate and the opposite substrate respectively to conduct the electrode layer and the pad for providing a signal transmission path therebetween. Owing to the thinner thickness of the alignment layer corresponding to the pad and the conductive member, no more does the alignment obstruct the conductive member to conduct the electrode layer and the pad. Furthermore, the alignment layer is preserved to completely cover the region except the bonding area of the conductive material, so as to provide an effective alignment near the conductive material in preventing light leakage due to abnormal alignment of the display medium, e.g. liquid crystal molecules.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:
1. A display panel having a first region and a second region, the display panel comprising:
    an active device array substrate, comprising:
        an active device array;
        a pad disposed in the second region;
        a first alignment layer covering the first region and the second region, wherein a thickness of the first alignment layer in the first region is substantially greater than a thickness of the first alignment layer in the second region, and the ratio of the thickness of the first alignment layer in the second region to the thickness of the first alignment layer in the-first region is substantially greater than zero and less than or equal to about 0.43;
    an opposite substrate disposed opposite to the active device array substrate, and the opposite substrate comprising:
        an electrode layer;
        a second alignment layer covering the electrode layer, wherein a thickness of the second alignment layer in the first region is substantially greater than a thickness of the second alignment layer in the second region, and the ratio of the thickness of the second alignment layer in the second region to the thickness of the second alignment layer in the first region is substantially greater than zero and less than or equal to about 0.43;

a display medium disposed between the active device array substrate and the opposite substrate; and a conductive member disposed between the active device array substrate and the opposite substrate, wherein the conductive member is located in the second region and corresponding to the pad, and the conductive member penetrates the first alignment layer and the second alignment layer to connect the electrode layer and the pad.

2. The display panel according to claim 1, wherein the first region comprises a display region, the second region is located in a peripheral circuit region outside the display region, and the active device array is located in the display region.

3. The display panel according to claim 2, further comprising a sealant disposed in the peripheral circuit region, wherein the conductive member is located within the sealant.

4. The display panel according to claim 1, wherein the display medium is a liquid crystal layer.

5. The display panel according to claim 1, wherein a top surface of the second alignment layer in the second region is lower than a top surface of the second alignment layer in the first region.

6. An active device array substrate, having a first region and a second region, the active device array substrate comprising:
an active device array;
a pad disposed in the second region; and
a first alignment layer covering the first region and the second region, wherein a thickness of the first alignment layer in the first region is substantially greater than a thickness of the first alignment layer in the second region, and the ratio of the thickness of the first alignment layer in the second region to the thickness of the first alignment layer in the first region is substantially greater than zero and less than or equal to about 0.43.

7. The active device array substrate according to claim 6, wherein the first region comprises a display region, the second region is located in a peripheral circuit region outside the display region, and the active device array is located in the display region.

8. A method of manufacturing a display panel, comprising:
providing an active device array substrate having a first region and a second region, the active device array substrate comprising:
an active device array;
a pad disposed in the second region;
a first alignment layer covering the first region and the second region, wherein a thickness of the first alignment layer in the first region is substantially greater than a thickness of the first alignment layer in the second region, and the ratio of the thickness of the first alignment layer in the second region to the thickness of the first alignment layer in the first region is substantially greater than zero and less than or equal to about 0.43;

providing an opposite substrate disposed opposite to the active device array substrate, the opposite substrate comprising:
an electrode layer;
a second alignment layer covering the electrode layer, wherein a thickness of the second alignment layer in the first region is substantially greater than a thickness of the second alignment layer in the second region, and the ratio of the thickness of the second alignment layer in the second region to the thickness of the second alignment layer in the first region is substantially greater than zero and less than or equal to about 0.43;

providing a display medium between the active device array substrate and the opposite substrate; and disposing a conductive member between the active device array substrate and the opposite substrate, wherein the conductive member is located in the second region and corresponding to the pad, and assembling the active device array substrate and the opposite substrate, wherein the conductive member penetrates the first alignment layer and the second alignment layer to connect the electrode layer and the pad.

9. The method according to claim 8, wherein the method of forming the first alignment layer or the second alignment layer comprises performing a transfer printing process by a photosensitive resin printing plate to print alignment material on the active device array substrate or the opposite substrate.

10. The method according to claim 9, wherein the printing plate has a plurality of transferring bumps thereon, and the distribution density of the transferring bumps corresponding to the second region is substantially less than the distribution density of the transferring bumps corresponding to the first region.

11. The method according to claim 9, wherein the printing plate has a plurality of transferring bumps thereon, and the height of the transferring bumps corresponding to the second region is different from the height of the transferring bumps corresponding to the first region.

12. The method according to claim 8, wherein the method of forming the first alignment layer or the second alignment layer comprises inkjet printing.

13. The method according to claim 8, wherein the first region comprises a display region, the second region is located in a peripheral circuit region outside the display region, and the active device array is located in the display region.

14. The method according to claim 13, further comprising forming a sealant in the peripheral circuit region to surround the display region before assembling the active device array substrate and the opposite substrate, and disposing the conductive member within the sealant.

15. The display panel according to claim 8, wherein a top surface of the second alignment layer in the second region is lower than a top surface of the second alignment layer in the first region.

* * * * *